(12) United States Patent
Kolehmainen

(10) Patent No.: US 9,219,387 B2
(45) Date of Patent: Dec. 22, 2015

(54) ROTOR OF A SYNCHRONOUS RELUCTANCE MACHINE AND THE METHOD FOR MANUFACTURING THE ROTOR OF A SYNCHRONOUS RELUCTANCE MACHINE

(75) Inventor: Jere Kolehmainen, Merikaarto (FI)

(73) Assignee: ABB TECHNOLOGY AG, Zurich (CH)

( * ) Notice: Subject to any disclaimer, the term of this patent is extended or adjusted under 35 U.S.C. 154(b) by 841 days.

(21) Appl. No.: 13/271,949

(22) Filed: Oct. 12, 2011

(65) Prior Publication Data

US 2012/0086289 A1 Apr. 12, 2012

(30) Foreign Application Priority Data

Oct. 12, 2010 (FI) ...................................... 20106052

(51) Int. Cl.
*H02K 15/02* (2006.01)
*H02K 1/24* (2006.01)

(52) U.S. Cl.
CPC ........... *H02K 1/246* (2013.01); *Y10T 29/49012* (2015.01)

(58) Field of Classification Search
CPC ..................................................... H02K 1/246
USPC ............. 310/156.77, 210, 211, 216.107, 162, 310/163
See application file for complete search history.

(56) References Cited

U.S. PATENT DOCUMENTS

| 4,110,646 | A | * | 8/1978 | Rao ................................ 310/163 |
| 4,459,502 | A | * | 7/1984 | El-Antably .................... 310/184 |
| 4,888,513 | A | | 12/1989 | Fratta |
| 5,296,773 | A | * | 3/1994 | El-Antably et al. ... 310/216.107 |
| 5,801,478 | A | | 9/1998 | Nashiki |
| 6,013,963 | A | * | 1/2000 | Shelton, Jr. .................... 310/179 |
| 6,066,904 | A | | 5/2000 | Fei et al. |
| 6,239,526 | B1 | | 5/2001 | Oh et al. |
| 6,906,448 | B2 | | 6/2005 | Yoshino et al. |
| 2003/0090170 | A1 | | 5/2003 | Yoshino et al. |

FOREIGN PATENT DOCUMENTS

DE 39 31 484 A1 4/1991
GB 1109974 A 4/1968
(Continued)

OTHER PUBLICATIONS

Chinese Office Action (Notification of the First Office Action) dated Jan. 14, 2014, issued by the State Intellectual Property Office of the People's Republic of China in corresponding Chinese Application No. 201110372564.4, and English translation of Office Action. (12 pages).

(Continued)

*Primary Examiner* — Dang Le
(74) *Attorney, Agent, or Firm* — Buchanan Ingersoll & Rooney PC

(57) ABSTRACT

A rotor is disclosed for a synchronous reluctance machine which includes an axis, which is supported by bearings to rotate inside a stator, and to which axis a rotor frame has been attached. The frame can be made of magnetically non-conductive material, having arranged magnetically conductive bar-shaped objects which extend through the rotor frame from the outer surface of the magnetic pole of the rotor to the outer surface of the pole. The whole length of each bar-shaped object inside the rotor frame can be surrounded by non-magnetic material.

16 Claims, 9 Drawing Sheets

(56) References Cited

FOREIGN PATENT DOCUMENTS

| | | |
|---|---|---|
| GB | 1114562 A | 5/1968 |
| GB | 1183630 A | 3/1970 |
| JP | 7-303357 A | 11/1995 |
| JP | 9-117083 A | 5/1997 |
| JP | 9-285087 A | 10/1997 |
| JP | 11-144930 A | 5/1999 |
| JP | 2000-014107 A | 1/2000 |
| JP | 2001-008422 A | 1/2001 |
| JP | 2001-157389 A | 6/2001 |
| JP | 2001-238418 A | 8/2001 |
| JP | 2003-153512 A | 5/2003 |
| JP | 2005-006416 A | 1/2005 |
| JP | 2005-245052 A | 9/2005 |
| JP | 2006-246571 A | 9/2006 |
| JP | 2008-109800 A | 5/2008 |
| KR | 10-0709301 B1 | 4/2007 |
| RU | 2 159 496 C1 | 11/2000 |
| WO | WO 96/42132 A1 | 12/1996 |

OTHER PUBLICATIONS

Search Report dated Mar. 22, 2011, issued in corresponding Finnish Patent Application No. 20106052. (2 pages).

Japanese Office Action dated Jul. 15, 2014, issued by the Japanese Patent Office in corresponding Japanese Application No. 2011-225214, and English translation of Office Action. (6 pages).

* cited by examiner

ROTOR OF A SYNCHRONOUS RELUCTANCE MACHINE AND THE METHOD FOR MANUFACTURING THE ROTOR OF A SYNCHRONOUS RELUCTANCE MACHINE

RELATED APPLICATION

This application claims priority under 35 U.S.C. §119 to Finnish Patent Application No 20106052 filed in Finland on Oct. 12, 2010, the entire content of which is hereby incorporated by reference in its entirety.

FIELD

The invention relates to a rotor of a synchronous reluctance machine. Furthermore, the invention relates to a method for manufacturing the rotor of a synchronous reluctance machine.

BACKGROUND INFORMATION

A synchronous reluctance machine has a multiphase stator winding which is fitted to the grooves of a stator core made of magnetically conductive sheets. The stator winding forms a magnetic field which rotates at a speed defined by the electrical grid or frequency converter connected to the electrical machine. The stator winding corresponds to the stator winding of an asynchronous machine or a synchronous machine. The rotor of the synchronous reluctance machine is fitted with bearings to rotate with an air gap between the rotor and the stator.

The operation of the synchronous reluctance machine is based on an anistropic rotor structure in which each rotor pole has a direction of minimum reluctance, the d-axis, and the direction of maximum reluctance, the q-axis. The rotor's d-axis follows the peak value of the stator's rotating magnetic field. The rotor is manufactured so that the magnetic conductivity is high in the direction of the d-axis and low in the direction of the q-axis. To maximize the power and torque of the synchronous reluctance machine, the ratio of the rotor's longitudinal inductance $L_d$ and the transverse inductance $L_q$ ought to be as great as possible. To achieve a great inductance ratio $L_d/L_q$, there are several suggestions for the structure in which well-conducting routes are formed for the flux in the direction of the d-axis and flux barriers are formed to prevent the flow of magnetic flux in the direction of the q-axis.

The conductive routes of the magnetic flux are, for example, formed of ferromagnetic sheets which are fitted so that the magnetic conductivity is great in the direction of the d-axis. Air or other non-ferromagnetic material can be used as flux barriers for the magnetic flux. When using air, the mechanical durability of the rotor must be ensured with support devices.

The publications JP 2005245052 and U.S. Pat. No. 6,239,526 characterize a synchronous reluctance machine rotor in which the flux barriers are formed to the rotor by punching or cutting off parts of the rotor core sheets.

GB 1,109,974 suggests a rotor structure in which thin electric sheets with the desired direction characteristics are assembled on the axis.

Publications KR 709301 and U.S. Pat. No. 6,066,904 suggest a two-pole synchronous reluctance machine's rotor which is assembled of thin directed electric sheets. To achieve the required anisotropy of reluctance, air gaps, i.e. magnetic barriers, are formed in the laminated sheets along the magnetic flux lines in accordance with the directional characteristics.

Publication JP 11144930 suggests forming the magnetic structure by layering magnetic and non-magnetic materials which are connected to each other with a metallurgic process.

Publication WO1996042132 A1 suggests using a rotor which is made of magnetic and non-magnetic materials and has a conductive non-magnetic protective layer on it.

SUMMARY

A rotor for a synchronous reluctance machine is disclosed comprising: an axis, supported with bearings to rotate inside a stator, to which a rotor frame has been attached, the frame being made of magnetically non-conductive material; and magnetically conductive bar-shaped pieces extending through the rotor frame from an outer surface a magnetic pole of the rotor to an outer surface of an adjacent pole, wherein a whole length of each bar-shaped piece is surrounded by the non-magnetic material inside the rotor frame.

A method to manufacture a rotor of a synchronous reluctance machine is also disclosed, which rotor includes magnetically non-conductive frame material and magnetically conductive access routes for magnetic flux, wherein the method comprises: providing a cylindrical rotor frame from magnetically non-conductive material; drilling multiple holes into the frame perpendicularly in relation to a rotor rotation axis, the holes extending through the frame from an outer surface of each pole to an outer surface of a next pole; and fitting magnetically conductive bars to the holes, the bars extending to an air gap of the synchronous reluctance machine at both ends.

A method to manufacture a rotor of a synchronous reluctance machine is disclosed, which rotor includes magnetically non-conductive frame material and magnetically conductive access routes for magnetic flux, wherein the method comprises: a) punching pieces out of a magnetically conductive sheet, the pieces corresponding to a width of a access routes for magnetic flux in the rotor and, in edge parts, having connecting bridges which follow an outer sphere of the rotor; b) stacking a first layer of punched-out pieces on top of each other to form a sheet pack with a thickness of the magnetic flux in a direction of the rotor axis; c) stacking, a distance from the previous layer, an additional layer of punched-out pieces on top of each other to form a sheet pack with a thickness of the magnetic flux in the direction of the rotor axis; d) repeating c) until a length of a blank formed by the sheet packs and separation pieces is the same as the rotor's length; f) casting a frame part of the rotor of magnetically non-conductive material which fills free parts of the blank; and g) removing uniform, magnetically conductive materials from an outer surface of the rotor.

BRIEF DESCRIPTION OF THE DRAWINGS

In the following, the invention will be described in more detail with the help of certain embodiments by referring to the enclosed drawings, where.

DETAILED DESCRIPTION

A new rotor structure of a synchronous reluctance machine is disclosed which has a high inductance ratio $L_d/L_q$, which is mechanically robust and durable even at high speeds, and which is economical to manufacture. The rotor for a synchronous reluctance machine can comprise an axis which is supported with bearings to rotate inside the stator and to which the rotor frame has been attached, whose frame is made of magnetically non-conductive material, and which has magnetically conductive bar-shaped pieces extending through the rotor frame from the outer surface of the rotor's magnetic pole to the outer surface of the adjacent pole, in which case the whole length of each bar-shaped piece is surrounded by the non-magnetic material inside the rotor frame.

An exemplary method to manufacture the rotor of a synchronous reluctance machine comprises the following phases:
  a cylindrical rotor frame is manufactured from magnetically non-conductive material;
  multiple holes are drilled into the frame perpendicularly in relation to the rotor's rotation axis, the holes extending through the frame from the outer surface of each pole to the outer surface of the adjacent pole;
  magnetically conductive bars are fitted to the holes, the bars extending to the air gap of the synchronous reluctance machine at their ends.

Another exemplary method to manufacture the rotor of a synchronous reluctance machine comprises the following phases:
  a) pieces are punched out of magnetically conductive sheet, the pieces corresponding to the width of the access routes for the magnetic flux in the rotor and, in edge parts, having connecting bridges which follow the outer sphere of the rotor;
  b) the first layer of punched-out pieces are stacked on top of each other to form a sheet pack with the thickness of the magnetic flux in the direction of the rotor axis,
  c) at a distance from the previous layer, an additional layer of punched-out pieces are stacked on top of each other to form a sheet pack with the thickness of the magnetic flux in the direction of the rotor axis;
  d) the phases are repeated c) until the length of the blank formed by the sheet packs and the separation pieces is the same as the rotor's length;
  f) the frame part of the rotor is cast of magnetically non-conductive material which fills the free parts of the blank;
  g) uniform, magnetically conductive materials are removed from the outer surface of the rotor.

Figure 12:
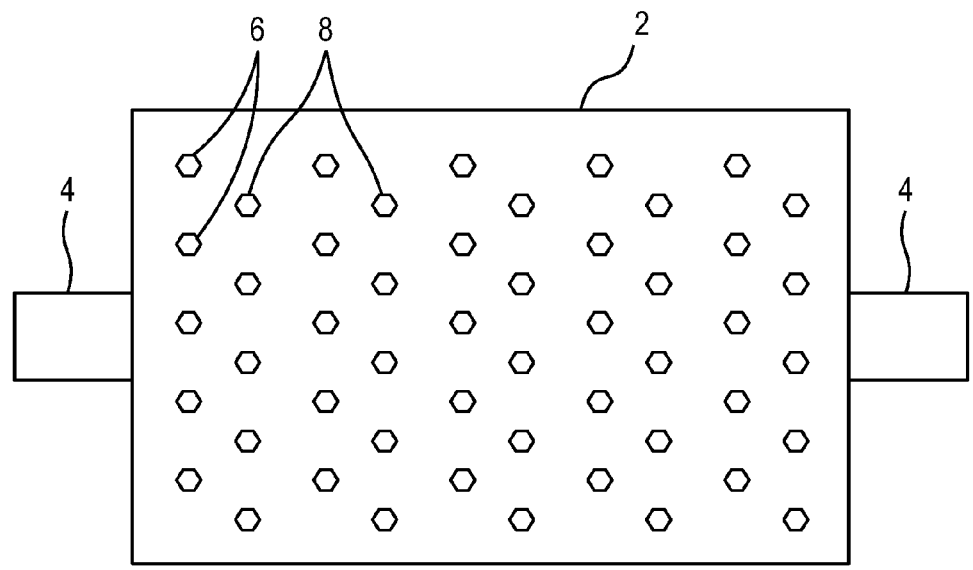
FIGS. 12-15 illustrate exemplary magnetically conductive bars in the shape of a hexagon, rectangle, parallelogram, and ellipse, respectively, according to the invention.
Figure 13:
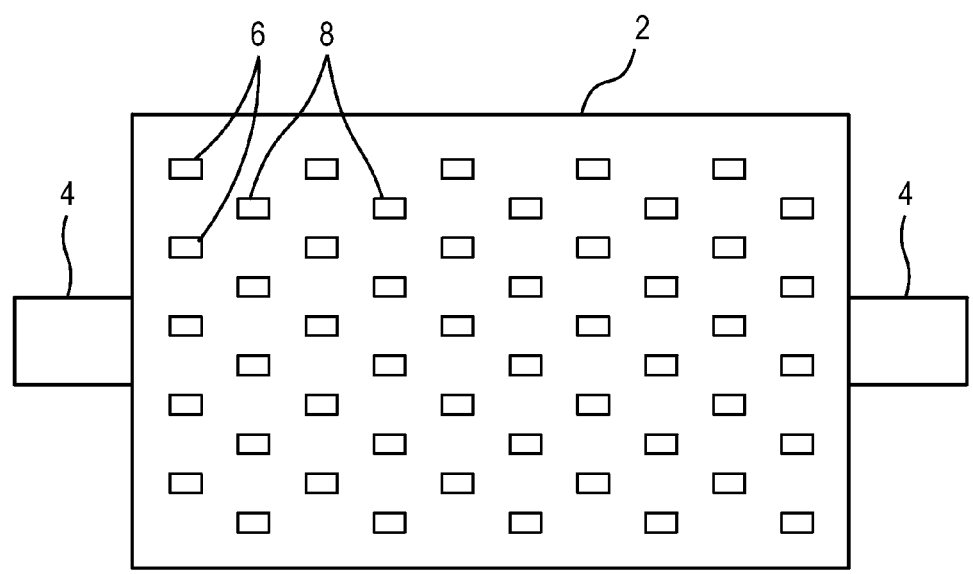
Figure 14:
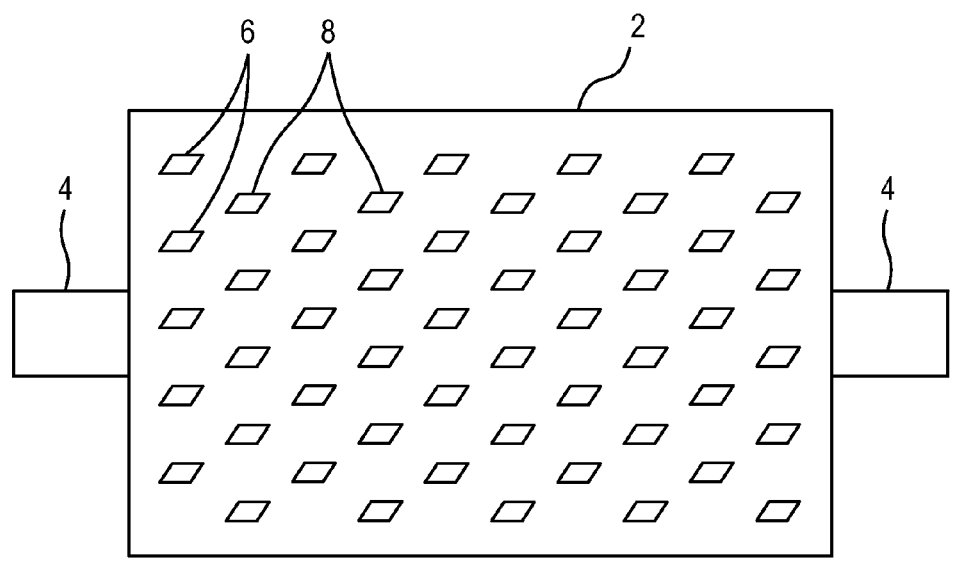
Figure 15:
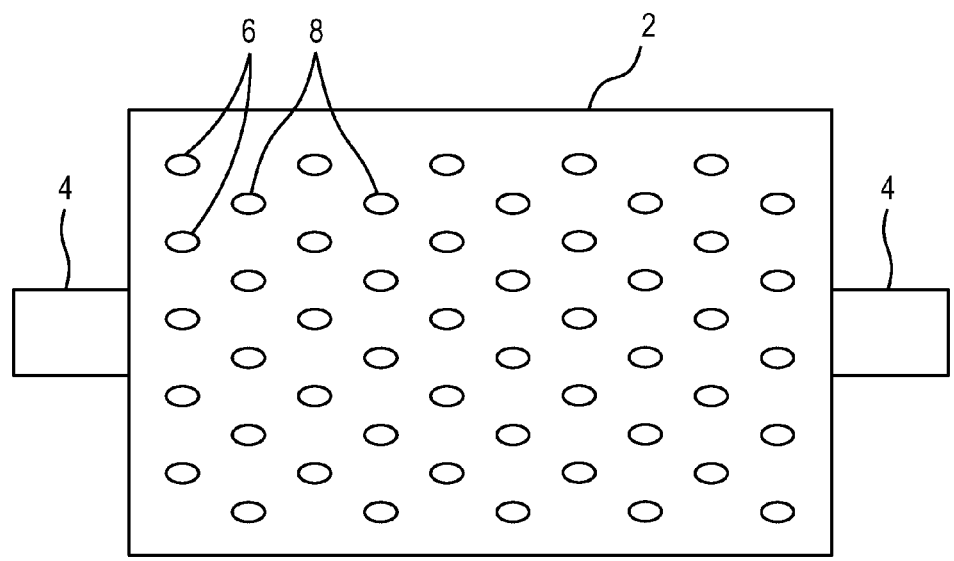

The magnetically conductive bar can be advantageously round rod. However, the shape of the cross-section of bars can be very different within the scope of the invention. Thus, for example, hexagon (FIG. 12), circle, rectangle (FIG. 13), parallelogram (FIG. 14) or ellipse (FIG. 15) are preferred cross-section shapes.

In connection with the invention, a bar is understood widely, and it can be a unified piece of material, a laminated structure made of stacked sheets, or it can be made of steel wire bundles, steel wire rope or braided wire. The bar material can be steel or electric sheet. Also NiFe and CoFe alloys are possible material for the bars.

Figure 1:
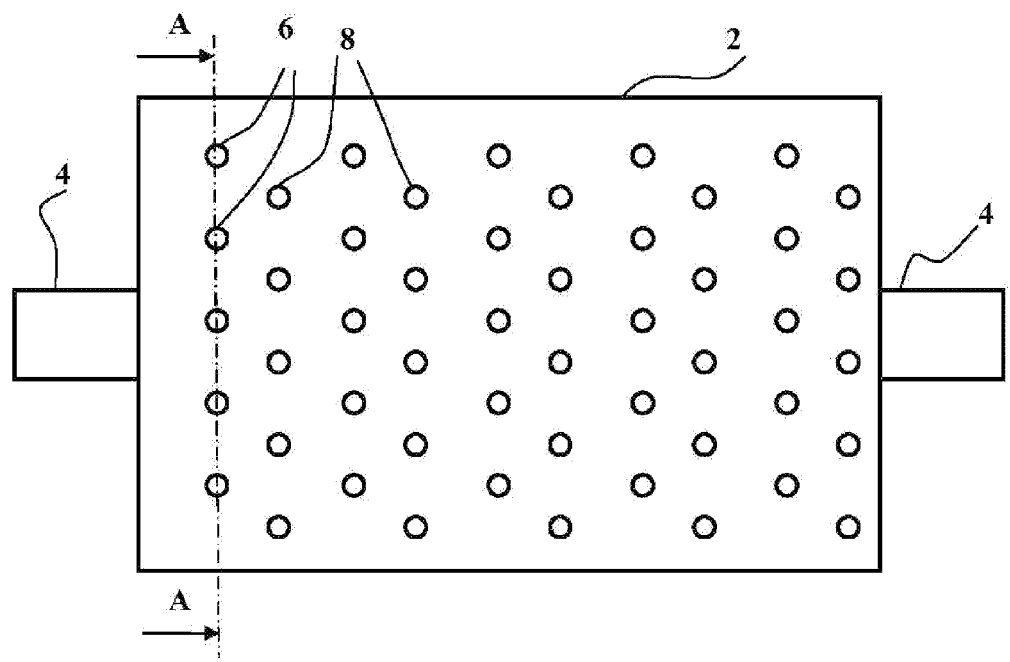
FIG. 1 illustrates the rotor according to the invention from the side view.
Figure 2:
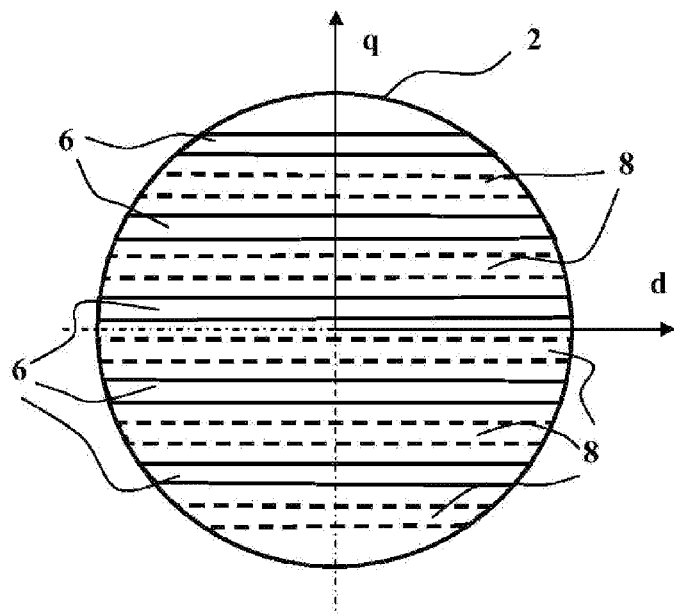
FIG. 2 illustrates the rotor cross-section A-A from FIG. 1.

A cross-section of the rotor of a synchronous reluctance machine is illustrated in FIG. 1. The rotor comprises the cylindrical frame part 2 which is made of magnetically non-conductive material, such as: aluminum; aluminum bronze; steel which does not conduct flux—for example, stainless steel; different plastics, resins or similar; titanium; or concrete. Both ends of the rotor have protruding parts 4 which protrude from the frame and act as the rotor axis; in this embodiment they are a part of the same object with the frame part 2, and are made of the same material. The rotor axis 4 is attached to the frame of the synchronous reluctance motor with bearings in a characteristic manner so that the rotor is supported centrally inside the stator of the synchronous reluctance motor, and the stator is located at the distance of an air gap from the stator. Bar-shaped pieces 6 and 8, later on bars are fitted inside the frame part 2, and they go through the frame part 2 perpendicularly to the axis 4 and the plane of the illustration. Bars 6 are made of magnetically conductive material, such as steel bar or electric sheet. According to the electromagnetic effect, the bars 6 are placed in the direction of the d-axis, in which case the reluctance in that direction is low and the reluctance in the perpendicular direction of the q-axis is high, which is illustrated in FIG. 2, which is the cross-section of FIG. 1A-A. The bars are for example preferably at a distance of approximately 0.5-1.5× the thickness of the bar both in the direction of the rotor axis and the rotor radius. A similar distance for the bars is also preferred in the other embodiments of the invention presented later.

In the embodiment illustrated in FIGS. 1 and 2 there are five rows of bars 6 in the axial direction, as in the example, and another five rows of bars 8, in which case the bars 8 have been moved in relation to bars 6 in the direction perpendicular to the axis and the plane of the illustration. This forms a grid structure for which each row comprises five bars, as in the example, and in total 50 bars which are placed in the direction of the d-axis of the rotor. In FIG. 2 the bars 8 are replaced with dotted lines. The thickness of magnetically conductive bars and the distances between them are only suggestive to illustrate the structure, and their dimensions are all determined by a professional on the basis of the machine's sizing values, depending on the materials and the sizing of the machine.

Figure 3:
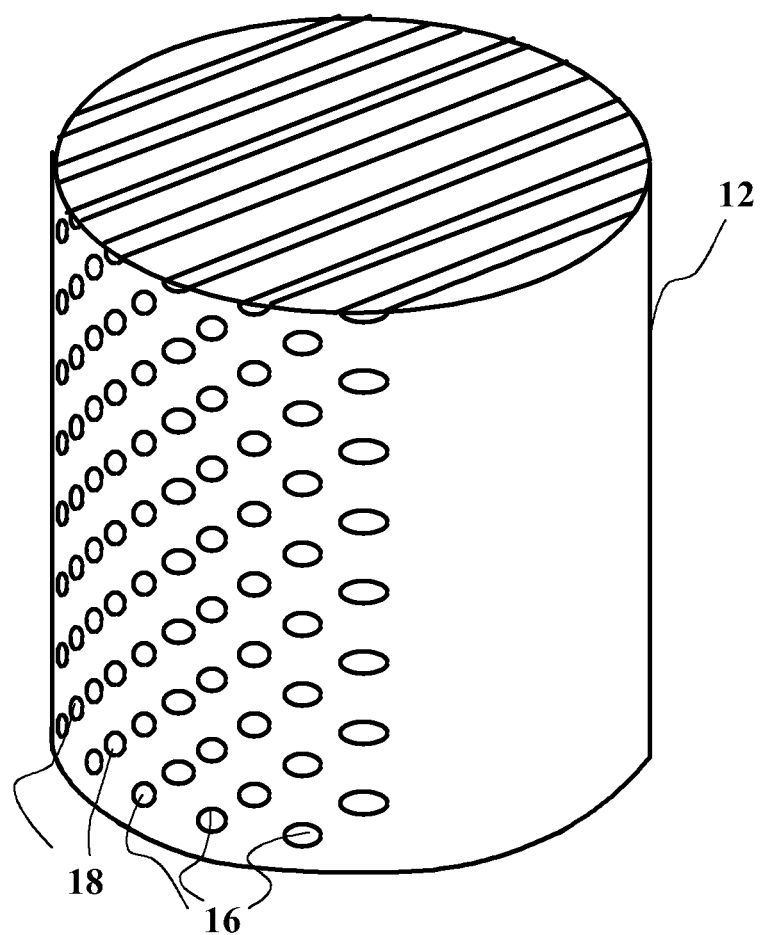
FIG. 3 illustrates the cross-section of the rotor according to the invention in perspective.

FIG. 3 illustrates in perspective a section of a frame part of the synchronous reluctance machine which is formed with the principle of FIGS. 1 and 2. Straight bars 16 have been fitted to the cylindrical frame part 12 in the first rows, and straight bars 18 moved in relation to them have been fitted to the second rows. All rows comprise seven bars which go through the rotor in the direction of the d-axis, which creates a grid structure of the part 98 in FIG. 3 representing the bar grid structure in the direction of the d-axis.

In the examples illustrated in FIGS. 1, 2 and 3, magnetically conductive bars are straight and have a round cross-section. These bars can be made with different methods. The grid structure formed by magnetically conductive bars can be supported to a desired form with separate support structures which are attached to the casting mould of the frame part. After that the frame part is cast and the support structures removed when necessary. The frame part can also be cast first to be ready, and the holes for bars can be drilled into it afterwards. Bars are fitted to the holes and attached to the frame part by gluing or by forming threads to the holes and screwing threaded bars to the frame part.

The bar structure can also be manufactured by stacking suitable magnetically conductive electric sheet strips on top of each other in the direction of the axis. The formed strip packs are fitted to form a desired grid structure, and the rotor frame part is cast of non-magnetic material.

Figure 4:
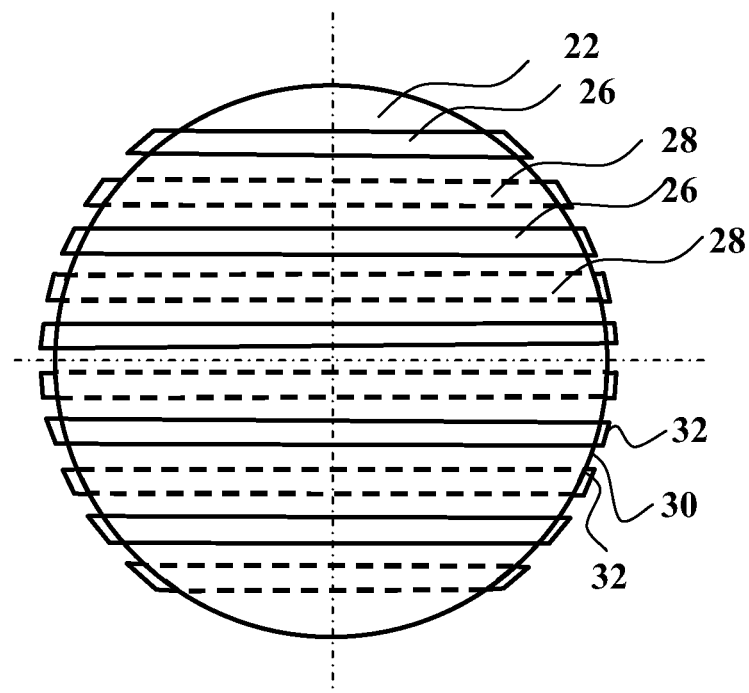
FIG. 4 illustrates a second cross-section of the rotor according to the invention.

FIG. 4 illustrates a second cross-section of the rotor of the synchronous reluctance machine according to the invention. The rotor frame part 22 is made of similar magnetically non-conductive material as in the embodiment illustrated in FIGS. 1 and 2. Magnetically conductive bars 26 and 28 are fitted to run through the holes in the frame part 22 and to extend outside the cylinder surface 30, in which case the bar ends 32 protrude from the cylinder surface 30. The distance of bar ends 32 from the stator of the synchronous reluctance machine is equal to the air gap.

Figure 5:
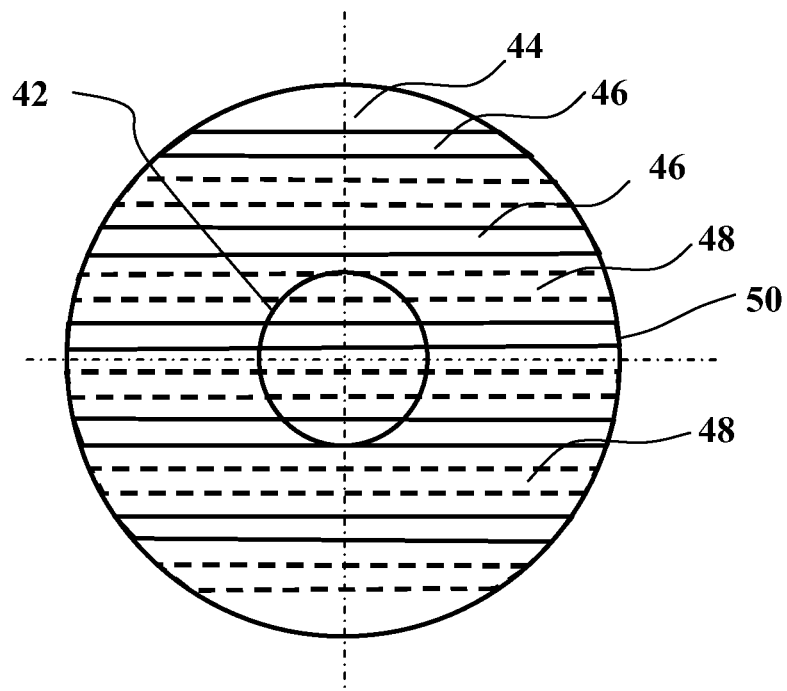
FIG. 5 illustrates a third cross-section of the rotor according to the invention.

FIG. 5 illustrates a third exemplary embodiment. In this embodiment the rotor frame is formed of two different materials, of the inner cylindrical frame part 42 which can preferably form the rotor axis. The outer rotor frame part 44, whose outer surface is limited inside the air gap of the machine, is located around the inner frame part 42. In the same way as in the embodiments of FIGS. 1 and 2, magnetically conductive bars 46 and 48 have been placed through the rotor, the bars running through the outer frame part 44 and, when applicable, through the inner frame part 42. The inner frame part 42 can be made of material which conducts the magnetic flux well or poorly. In the embodiment illustrated in FIG. 5, the magnetically conductive bars 46 and 48 extend to the outer surface 50 of the rotor's outer frame part 44. In the same way as in the embodiment of FIG. 4, the magnetically conductive bars 46 and 48 can also protrude over the outer surface 50 of the rotor's outer frame part 44, in which case the distance of the bar ends from the stator is the air gap of the machine.

Figure 6:
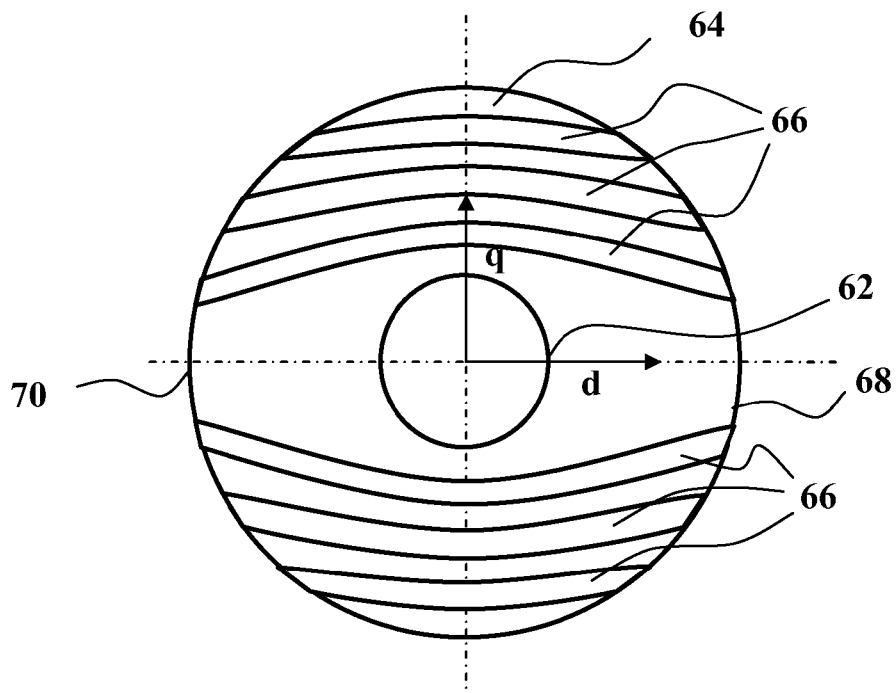
FIG. 6 illustrates a fourth cross-section of the rotor according to the invention.

A fourth exemplary embodiment is illustrated in FIG. 6. The rotor frame is made of the inner part 62 and the outer part 64 surrounding it, in which case at least the outer part 64 of the rotor frame is made of material conducting the magnetic flux poorly. At the same time, the inner part preferably forms the rotor axis. The magnetically conductive bars 66 are fitted to run through the outer part 64 of the rotor frame. The bars 66 are made curvilinear so that they run from the rotor surface 68 to the opposite surface 70 bypassing the inner part 62. Thus, the structure has very good magnetic conductibility in the direction of the d-axis and, correspondingly, poor conductivity in the direction of the q-axis. In the manufacture of the fourth embodiment, it is advantageous to use strips made of electric sheet stacked on top of each other in the direction of the rotor axis to achieve the desired magnetically conductive bar 66. The bars are supported in the cast moulding and the frame parts 62 and 64 are cast so that the edges of bars 66 are completely surrounded by the frame part 64 conducting the magnetic flux poorly, and the bars extend as far as the outer surface of the rotor. In this embodiment the bars 66 conducting the magnetic flux can also be arranged into a grid structure as in 1-5.

Figure 7:
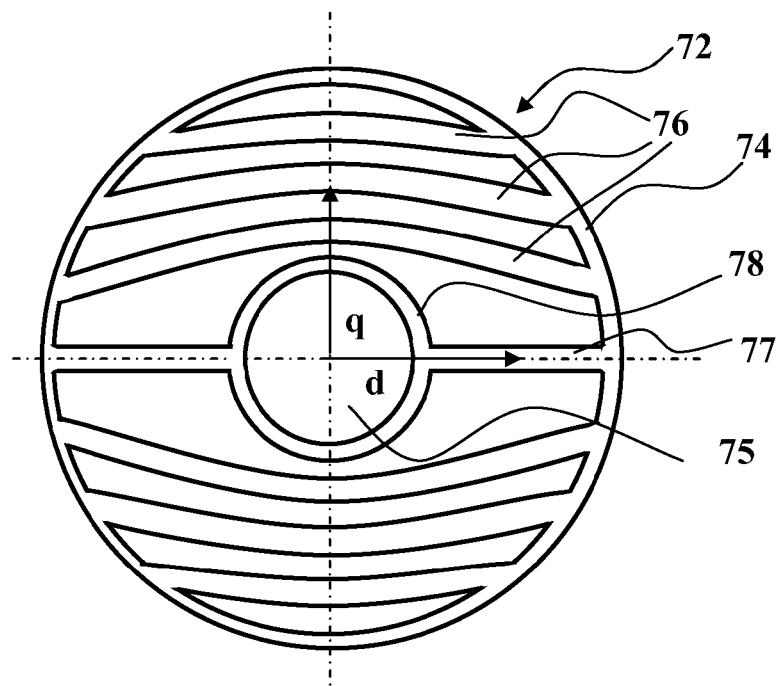
FIG. 7 illustrates a fifth cross-section of the rotor according to the invention.

FIG. 7 illustrates a fifth embodiment, in which a solid part 72 made of magnetically conductive material has been manufactured preferably by punching it out from an electric sheet. The outer edge of the part 72 comprises a narrow spherical part 74 which essentially keeps the strips 76 located in the direction of the rotor's d-axis in their place. The part 72 also has the inner rim 78 running around the rotor axis or the inner part, and the inner rim 78 is connected to the spherical part with strips 77. Sheets punched out of electric sheet are stacked on top of each other to form sufficiently thick magnetically conductive parts 74, 76, 77 and 78. The stacked sheets are fitted to the cast moulding so that space is left between the sheet stacks to separate the sheet stacks from each other. The inner rim 74 is preferably fitted on the axis 75 which also supports the structure. The outer part of the rotor frame is cast of material conducting the magnetic flux poorly. Finally, the rim part 74 is removed throughout the length of the rotor, in which case the strips in the direction of the d-axis will extend to the outer surface of the rotor. Thus, the outer surface of the rotor according to the fifth embodiment is essentially similar to the rotor according to the fourth embodiment in FIG. 6.

Figure 8:
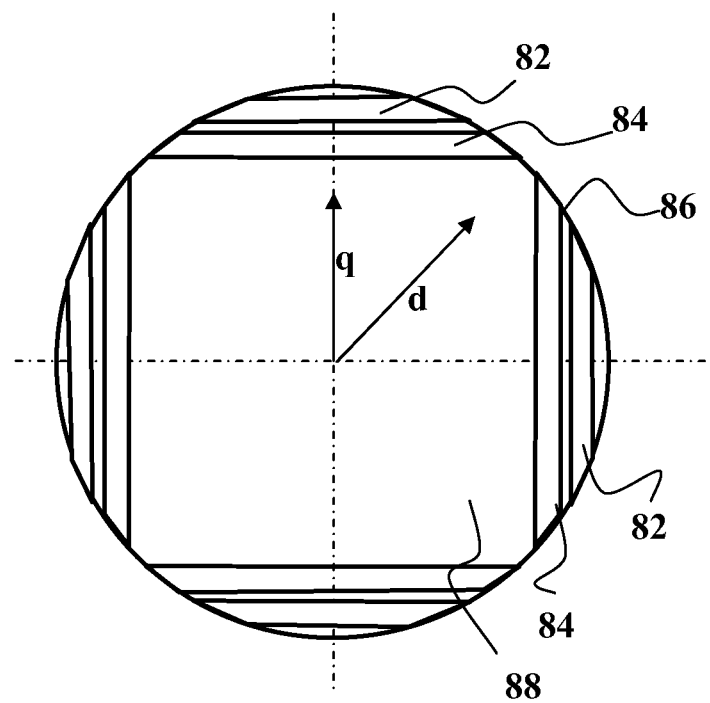
FIG. 8 illustrates a sixth cross-section of the rotor according to the invention.

An exemplary structure which realizes the four-pole rotor is presented in FIG. 8 as the sixth embodiment. One d-axis of the rotor and one q-axis are illustrated with arrows. Magnetically conductive bars 82 and 84 are grouped into four segments with 90 degree increments. Each bar 82 and 84 extend up to the rotor's outer sphere 86. The rotor frame part 88 is made of material not conducting the magnetic flux, and it surrounds each bar 82 and 84. Bars 82 and 84 can have a round cross-section fitted to the holes drilled or otherwise made on the frame part. The shape of the bars' cross-section can also be square or rectangular, and the bars can be made of electric sheet, in which case they can be fitted to the cast moulding to which the frame part 88 is cast. In the embodiment of the FIG. 8 the magnetically conductive bars are straight. Alternatively, the bars can be curved inwards, whereby the middle of the bar is closer to the rotational axis of the rotor.

Figure 9:
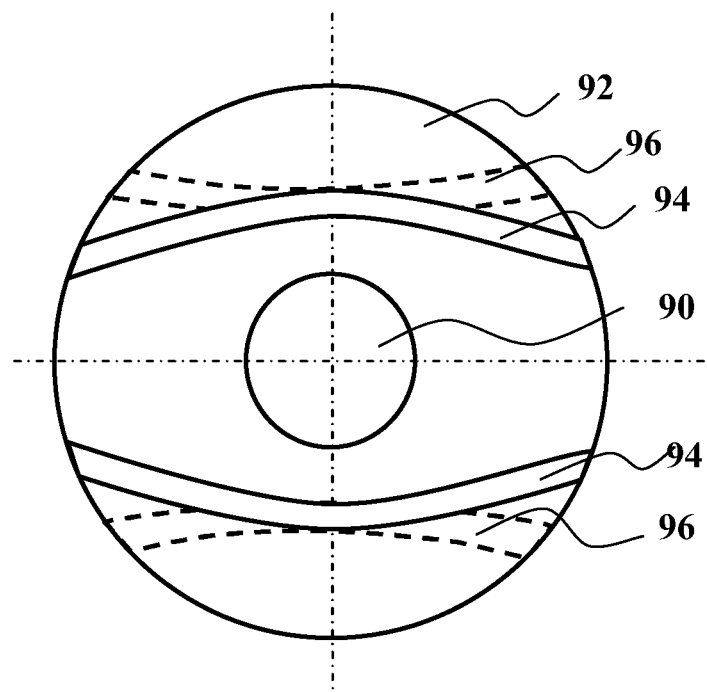
FIG. 9 illustrates a seventh cross-section of the rotor according to the invention.

A seventh embodiment is presented in FIG. 9, in which the frame part 92 made of magnetically non-conductive material has been fitted around the axis 90. The magnetically conductive bars 94 have been shaped curvilinear so that they are curved inwards. In addition, bars 96 curving outwards have been fitted to the frame part. The bars are drawn with dotted lines and are located in the direction of the rotor axis within a distance to the bars 94. When moving from one end of the rotor to another in the axial direction, every second bar is curved inwards 94 and every second bar outwards 96. The whole length of each bar is surrounded by the frame part 92 material, in which case the magnetic flux has an access route through the bars and the flow of the magnetic flux from one bar to another is prevented.

Figure 10:
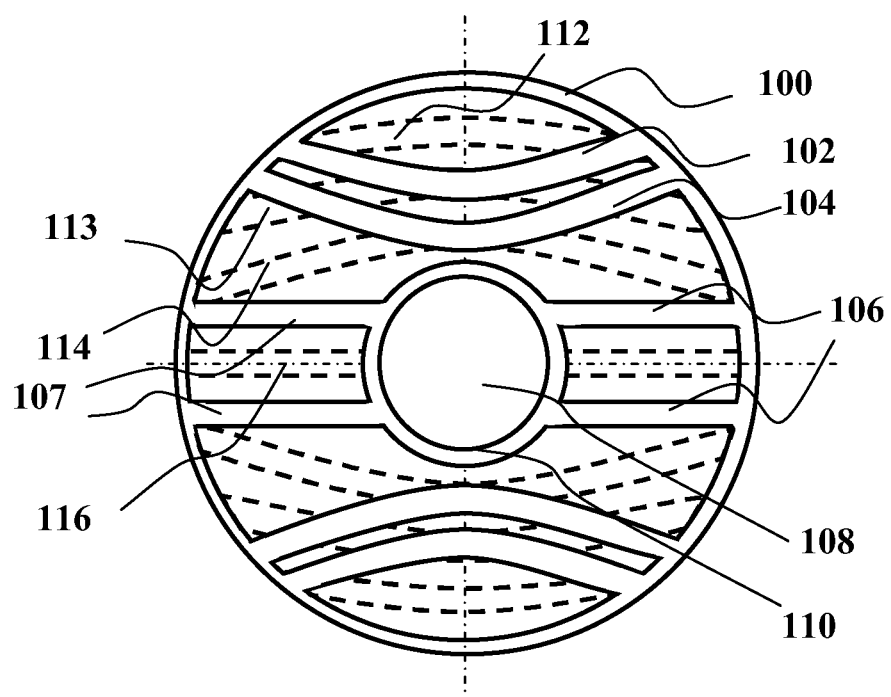
FIG. 10 illustrates an eighth cross section of the rotor according to the invention.

An eighth embodiment is illustrated in FIG. 10. This embodiment utilizes the technique of FIG. 7, the fifth embodiment, in which the bar blanks are first made of electric sheets. According to the eighth embodiment, a blank is made of electric sheet whose outer edge has a narrow rim part 100 and the strips 102 and 104 operating as the conductors of the magnetic flux related to them. The strips 102 and 104 are curved inwards extending from the rotor edge to another part of the rotor edge, whereby the middle of the strip is closer to the horizontal middle axis of the cross-section. In addition, two strips 106 have been attached to the spherical part, the strips being attached to the inner rim 110 around the rotor axis 108. From the opposite side, the inner rim 110 is connected with strips 107 to the spherical part 100. Blanks are stacked on top of each other to form a sufficiently thick bar from the strips 102, 104, 106, 107 and the inner rim 110. Within a distance there is another blank with strips 112, 113 and 114 that are curved outwards, drawn with dotted lines in FIG. 10. The middle of the strips 112, 113 and 114 is farther from the horizontal middle axis of the cross-section than the ends of the strips. Strips 112, 113 and 114 are also attached at both ends to the narrow spherical part which surrounds the blank on the outer edge. The strip 116 is attached from one end to the inner rim of the second blank and from the other end to the spherical part of the outer edge. The inner rim of the second blank is also fitted on the rotor shaft 108. The sheet packs stacked from the first and second blanks are placed one after another on the rotor axis so that there is a gap between adjacent sheet packs. The gaps between the strips conducting the magnetic flux are filled with material not conducting the magnetic flux. Finally, the narrow spherical part 100 located on the outer edge is removed, in which case the bars made of electric sheets and conducting the magnetic flux extend up to the rotor's outer surface.

Figure 11:
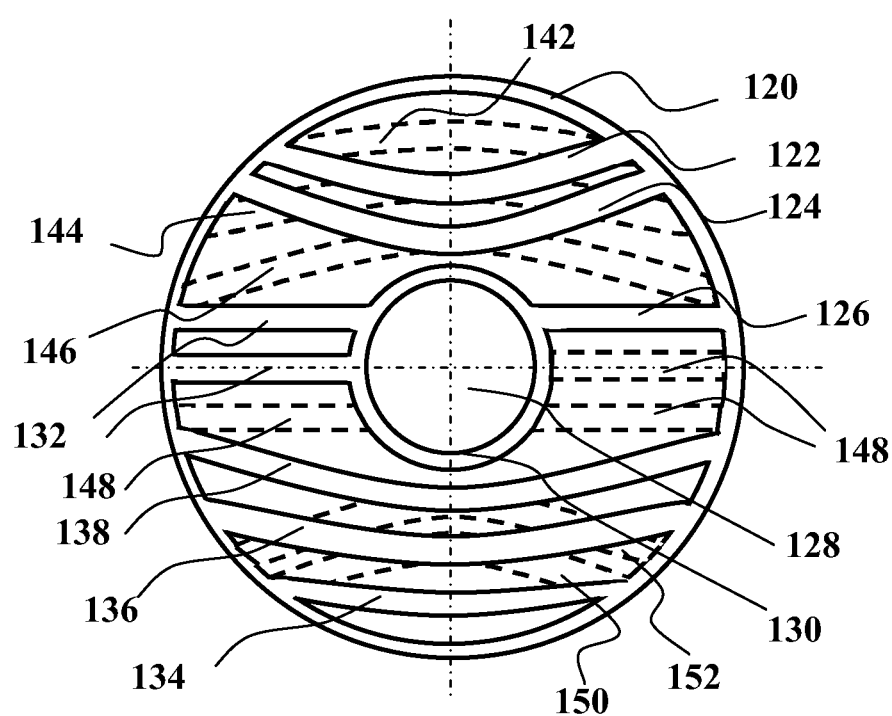
FIG. 11 illustrates a ninth cross section of the rotor according to the invention.

A ninth embodiment is illustrated in FIG. 11. This embodiment also utilizes the technique of FIG. 7, the fifth embodiment, in which the bar blanks are first made of electric sheets. In the same way as in the eighth embodiment, a blank is made of electric sheet whose outer edge has a narrow rim part 120 and the strips 122 and 124 operating as the conductors of the magnetic flux related to them. The strips 122 and 124 are curved inwards extending from the rotor edge to another part of the rotor edge. In addition, one strip 126 has been attached to the spherical part attached to the inner rim 130 around the rotor axis 128. From the opposite side, the inner rim 130 is connected with strips 132 to the spherical part 120. On the lower half of the blank there are three strips 134, 136 and 138 that are curved outwards. The blanks are stacked on top of each other to form a sufficiently thick bar from the strips 122, 124, 126, 132, 134, 136, 138 and the inner rim 110 to form a first set of bars.

Within a distance from the first set of bars there is a second set of bars. The second set of bars consists of a second blank with strips 142, 144 and 146 curving outwards on the upper portion of the cross-section and drawn with dotted lines in FIG. 11. Strips 142, 144 and 146 are also attached at both ends to the narrow spherical part which surrounds the blank on the outer edge. The strips 148 are attached from its one end to the inner rim of the second blank and from its other end to the spherical part of the outer edge. The inner rim of the second blank is also fitted on the rotor shaft 128. On the lower half of the second blank there are two strips 150 and 152 that are curved inwards. The blanks of the first and the second set are similar but turned around. Thus only one punching tool is needed to make all the blanks. The sheet packs stacked from the first and second blanks are placed one after another on the rotor axis so that there is a gap between adjacent sheet packs. The gaps between the strips conducting the magnetic flux are filled with material not conducting the magnetic flux. Finally, the narrow spherical part 120 located on the outer edge is removed, in which case the bars made of electric sheets and conducting the magnetic flux extend up to the rotor's outer surface.

In the above, the invention has been described with the help of certain exemplary embodiments. However, the description should not be considered as limiting the scope of patent protection; the embodiments of the invention may vary and remain within the scope of the claims, as it is the claims which define the scope of the invention.

The invention claimed is:

1. A rotor for a synchronous reluctance machine comprising:
   an axis, supported with bearings to rotate inside a stator, to which a rotor frame has been attached, the frame being made of magnetically non-conductive material; and
   magnetically conductive bar-shaped pieces extending through the rotor frame from an outer surface of a magnetic pole of the rotor to an outer surface of an adjacent pole, wherein a whole length of each bar-shaped piece is surrounded by the non-magnetic material inside the rotor frame,
   wherein the bar-shaped pieces are elongated in a direction perpendicular to the axis.

2. A rotor according to claim 1, wherein the bar-shaped pieces are straight or curved.

3. A rotor according to claim 1, wherein a shape of a cross-section of bar-shaped pieces is hexagonal.

4. A rotor according to claim 1, wherein the bar-shaped pieces are located from each other at a distance of approximately 0.5-1.5 times a thickness of a bar-shaped piece both in a direction of the rotor axis and a rotor radius.

5. A rotor according to claim 1, wherein cross-sections of the bar-shaped pieces are round.

6. A rotor according to claim 1, wherein a shape of a cross-section of the bar-shaped pieces is rectangular.

7. A rotor according to claim 1, wherein a shape of a cross-section of the bar-shaped pieces is parallelogram.

8. A rotor according to claim 1, wherein a shape of a cross-section of the bar-shaped pieces is elliptic.

9. A rotor according to claim 1, wherein the bar-shaped pieces are made of steel or electric sheet.

10. A rotor according to claim 1, wherein the bar-shaped pieces are made of a small stack of electric sheets, or steel wire bundle, or steel wire, or braided wire.

11. A rotor according to claim 10, wherein a grid made of steel wire is cast in aluminum bronze.

12. A rotor according to claim 1, wherein an end of the bar-shaped pieces is at a level of the rotor's outer surface.

13. A rotor according to claim 1, wherein an end of the bar-shaped pieces is protruding from a rotor surface.

14. A rotor according to claim 1, wherein the rotor frame is solid and the rotor axis is attached to rotor ends.

15. A rotor according to claim 1, wherein the rotor frame is solid and has been fitted on the rotor axis.

16. A rotor according to claim 1, wherein the rotor frame is made of one of the following materials: aluminum, aluminum bronze, steel not conducting flux, different plastics, resins, titanium, and concrete.

* * * * *